United States Patent Office 3,071,575
Patented Jan. 1, 1963

3,071,575
SYNTHETIC PENICILLINS AND SALTS THEREOF
Frank Peter Doyle, Betchworth, John Herbert Charles Nayler, London, and George Newbolt Rolinson, Betchworth, England, assignors to Beecham Research Laboratories Limited, Brentford, England, a British company
No Drawing. Filed Aug. 4, 1959, Ser. No. 831,485
Claims priority, application Great Britain July 15, 1959
6 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to certain 6-(α-substituted-phenylacetamido)penicillanic acids and nontoxic salts thereof.

This application is a continuation-in-part of our prior, copending application S.N. 750,075, filed July 22, 1958 and issued June 21, 1960, as U.S. Patent 2,941,995.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith.

There is provided, according to the present invention, a member selected from the group consisting of an acid having the formula

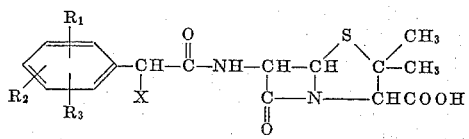

wherein $R_1$ and $R_2$ and $R_3$ each represent a member selected from the group consisting of hydrogen, nitro, amino, (lower)alkylamino, di(lower)alkylamino, acylamino (where the acylating agent is an aliphatic carboxylic acid containing from one to ten carbon atoms inclusive and the substituent may thus also be named (lower)alkanoylamino) (lower)alkyl (including straight and branched chain saturated aliphtic groups containing from one to ten carbon atoms inclusive), chloro, bromo, iodo (lower)alkoxy, hydroxy and sulfamyl and X represents a member selected from the group consisting of fluoro, chloro, bromo, iodo, phenyl, hydroxy (lower)-alkoxy and (lower)alkanoyloxy (i.e., lower acyloxy); and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1 - ephenamine, N,N' - dibenzylethylenediamine, dehydroabietylamine. N,N' - bis - dehydroabietylethylenediamine, and other amines which have been used to form salts with benzylpenicillin. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula

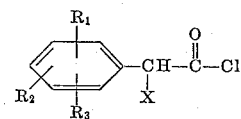

wherein $R_1$, $R_2$, $R_3$ and X have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about 30 minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is of course advisable when more than one phase is present, e.g., solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

When an acid chloride, an acid bromide or an acid anhydride is used in the process of the present invention, it is prepared from the corresponding acid according to the techniques set forth in the literature, e.g., for phenylacetic acid. In any instances where the substituted phenylacetic acid has not been described, it is prepared by the standard methods, e.g., as shown in Example 4 as by use of the malonic ester synthesis followed by saponification and decarboxylation. Thus as with ethyl phenylacetate, a ring-substituted ethyl phenylacetate is carbonylated to give a diethyl substituted-phenylmalonate.

6-aminopenicillanic acid is prepared according to Batchelor et al. (Nature 183, 257–258, January 24, 1959) or Belgian Patent 569,728. It is used in the above reaction as the salt of a metal or a tertiary hydrocarbonyl amine or as an ester of a hydrocarbonyl alcohol.

Hydrocarbonyl alcohols and tertiary hydrocarbonyl amines are compounds having the formulae

and

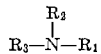

wherein the R groups contain only the elements carbon and hydrogen.

PREPARATION OF 6-AMINOPENICILLANIC ACID

As set forth in our prior, copending application S.N. 750,075, filed July 22, 1958, of which this application is a continuation-in-part, the intermediate 6-aminopenicillanic acid is isolated after removal of the natural penicillins from penicillin fermentation broths prepared without the use of added precursors such as phenylacetic acid. For this purpose, suitable penicillin-producing moulds include species of Penicillium, for example *Penicillium chrysogenum* 5120C, and the members of the notatum-chrysogenum group. The mould is grown preferably under aerobic submerged culture conditions. The culture medium used can be one of the generally accepted media commonly used in the preparation of penicillins. The culture medium usually consists essentially of a carbohydrate nutrient material, for example glucose or lactose; calcium carbonate, sodium sulphate, and a nitrogenous material capable of providing the nitrogen necessary for the growth of the mould. The nitrogenous material can be either a natural substance, for example peanut meal, or it can be one or more chemical compounds containing nitrogen, for example ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S., 69, 3010, (1947), and J. Bact. 59, 51, (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralizing the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinbefore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble. It will be seen from the examples below that in some instances a very considerable increase in antibiotic activity was obtained as a result of the chemical modification of the fermentation liquor according to the process of this invention.

Thus, 6-aminopenicillanic acid was prepared and isolated as follows:

(a) A strain of *Penicillium chrysogenum* 5120C (obtained from Professor E. B. Chain, Instituto Superiore di Sanita, Rome) was first grown on a glycerol-molasses agar slope for 7 days at 26° C. Sterile distilled water was then added and the spores washed off the surface of the culture to produce a spore suspension. About 10 mls. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilizing the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 5.0% w./v., $Na_2SO_4$ 0.1% w./v., $CaCO_3$ 1.0% w./v. and tap water. The pH was adjusted to 7.2 before the fermenter and its contents were sterilized. After inoculation the tank was maintained at 26-28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol. The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. 3 vols. of acetone was then added with stirring and the precipitate removed by centrifuging. The clear liquor was then concentrated to 2280 mls. and the pH adjusted to 7.0. It had a potency of 54 μ/mgm. assayed as described below.

The 6-aminopenicillanic acid was assayed by reacting a sample with phenylacetyl chloride and assaying the penicillin found by the cup plate method described by N. G. Heatley in Biochem. J. 38, 61 (1944) using *B. subtilis* as the bacterium. The purity of the preparation can then be expressed in units per mgm. (μ/mgm.) of dry substance.

The potency of pure 6-aminopenicillanic acid assayed by this method is 2750 μ/mgm.

(b) 1200 mls. of the concentrate of potency 54 μ/mgm. were percolated through 200 gms. of Dowex I resin conditioned with hydrochloric acid. The column was washed with water and this wash combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900 μ/mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200 μ/mgm. (80% pure). Repeated precipitation of the crystalline material from neutral aqueous solution by the addition of hydrochloric acid gave a white crystalline solid of melting point 209–210° C. assaying at 2740 μ/mgm. analyzing as follows: (Found: C, 44.6; H, 5.7; N, 13.1; S, 14.1%. $C_8H_{12}O_3N_2S$ requires: C, 44.4; H, 5.6; N, 13.0; S, 14.8%).

PREPARATION OF DERIVATIVES OF 6-AMINO-PENICILLANIC ACID

The procedure to be followed in preparing antibiotic substances from 6-aminopenicillanic acid depends largely upon the extent to which the starting material has itself been purified. Thus 6-aminopenicillanic acid may be used in three different stages of purification, as indicated below:

(a) From Isolated 6-Aminopenicillanic Acid

When 6-aminopenicillanic acid is available in relatively pure form it is only necessary to use a small excess (ca. 20%) of reagent and the product is, in turn, obtained fairly pure (as indicated by manometric assay using penicillanase).

The reagents used in this way include fifteen different monocarboxylic acid chlorides and also adipyl chloride, propionic anhydride, carbobenzoxyglycine ethoxy-formic anhydride, benzyl chloroformate, and p-toluenesulphonyl chloride.

(b) From 6-Aminopenicillanic Acid Concentrates

The starting material was a clarified fermentation liquor which has been subjected to an initial concentration procedure and from which the natural penicillins had been substantially removed by solvent extraction at pH 2 to 3. The neutralized aqueous solution usually contained 0.6–1.2 mg./ml. of 6-aminopenicillanic acid, which represented about 1% of the total solids present.

With such material it was necessary to use a much larger excess of reagent (10 to 50 times the theoretical amount) because various impurities (e.g., amino-acids and simple peptides) would also be susceptible to acylation and similar reactions. The products were worked up in essentially the same way as in (a), but the resulting sodium salts were, of course, very much less pure.

The reagents used in this way include phenoxyacetyl chloride, phenylacetyl chloride, α-chlorophenylacetyl chloride, chloroacetyl chloride, diphenylacetyl chloride, and adipyl chloride (all of which had also been reacted by Method a and also α-naphthylacetyl chloride, β-naphthoxyacetyl chloride and p-nitrophenoxyacetyl chloride.

(c) From Dilute Brew

The initial material was the original clarified fermentation brew from which natural penicillins had been substantially removed by solvent extraction at pH 2 to 3, but which had not been concentrated. It was thus about ten times more dilute than the solutions used in Method b. Use of a large excess of reagent was again essential. With this very dilute material no attempt was made to isolate the reaction products, but the formation of antibiotic material was demonstrated by the increased antibacterial activity of the solution after reaction and by paper chromatography, a new zone of biologically active material being detected in every case.

The reagents used successfully in this way include phenoxyacetyl chloride, phenylacetyl chloride, α-naphthylacetyl chloride, α-naphthoxyacetyl chloride, β-naphthoxyacetyl chloride, p-nitrophenoxyacetyl chloride, α-chlorophenylacetyl chloride, diphenylacetyl chloride, crotonyl chloride. chloroacetyl chloride, phthalimidoacetyl chloride, benzoyl chloride, hexahydrobenzoyl chloride, m-sulphobenzoyl chloride, adipyl chloride, propionic anhydride, and n-butyric anhydride.

Two typical procedures are illustrated in detail as performed with phenoxyacetyl chloride to produce the known penicillin V, thus:

PROCEDURE A

A strain of *Penicillium chrysogenum* (5120C obtained from Professor E. B. Chain, Istituto Superiore di Sanita, Rome) was grown on a glycerol-molasses agar slope for 7 days at 26° C. The spores obtained were removed by washing with sterile distilled water and the suspension of spores obtained was used to inocuate 100 ml. of a culture medium contained in a 500 ml. conical flask. The flask and its contents had previously been sterilized with steam under pressure in an autoclave. The culture medium used was one having the following composition:

| | Parts by weight |
|---|---|
| Water | 100 |
| Corn steep liquor | 8 |
| "Liquid glucose" | 6 | and the pH of the medium had been adjusted to a value of 5.2–5.3 by the addition of a solution of sodium hydroxide. The "liquid glucose" used was a mixture of carbohydrates consisting essentially of maltose, glucose and low molecular weight dextrins. The inoculated flask was shaken for 48 hours at a constant temperature of 26° C. on a rotary shaking machine having a throw of 3.4 cm. and operating at 250 r.p.m. At the end of this period of 48 hours a substantial growth of mycelium had been obtained in the flask. The resulting culture was then used to inoculate a synthetic fermentation medium without the addition of an added precursor. The fermentation medium used had the following composition:

| | Parts by weight |
|---|---|
| Water | 100.0 |
| Lactose | 4.0 |
| Glucose | 2.0 |
| Ammonium lactate | 0.5 |
| Ammonium acetate | 0.3 |
| $KH_2PO_4$ | 0.3 |
| $Na_2SO_4$ | 0.05 |
| $FeSO_4 \cdot 7H_2O$ | 0.01 |
| $MgSO_4 \cdot 7H_2O$ | 0.025 |
| $ZnSO_4 \cdot 7H_2O$ | 0.002 |
| $MnSO_4$ | 0.002 |
| $CaCl_2 \cdot 2H_2O$ | 0.005 |
| $CuSO_3 \cdot 5H_2O$ | 0.0005 |
| $CaCO_3$ | 1.0 |

The pH of the fermentation medium was about 6. The fermentation was carried out in a flask on a shaking machine at 26° C.

At the end of the 96 hours' fermentation period, the mycelium obtained was filtered from the fermentation broth and the fermentation liquor obtained as the filtrate was acidified to pH 3 with phosphoric acid and extracted once with half of its volume of butyl acetate at 5° C. which removed most of the penicillins which it contained.

The extracted fermentation liquor was neutralized with sodium hydroxide solution and assayed by means of the cup plate method described by N. G. Heatley in Biochem. J., 38, 61 (1944), using *B. subtilis* as the bacterium.

A 50 ml. portion of the extracted fermentation liquor was brought to pH 8 by the addition of solid sodium bicarbonate and stirred at 0° C. while a solution of 0.5 g. of phenoxyacetyl chloride in acetone was added in the course of a few minutes. The mixture was stirred at 0° C. for one hour, filtered, and excess reagent was removed by extraction with three portions of ether.

The ether extracts were themselves washed with water and the washings added to the main aqueous solution which was then readjusted to pH 6 to 7 by the addition of hydrochloric acid.

Assay of the aqueous solution obtained (which had a volume of 65 ml.) using the method referred to above, showed that it contained a material having considerable antibiotic activity which was about 11 times greater for the whole volume of liquid than that of the initial solution. The results obtained from the assay were as follows:

| | Activity (International Units) |
|---|---|
| Extracted fermentation liquid (volume 50 ml.) | 650 |
| Reaction product (volume 65 ml.) | 7,150 |

By means of paper chromatography it was shown that the antibiotic material contained in the aqueous solution had an Rf value of the same order as penicillin V and the stability of the aqueous solution at pH 2 also indicated a resemblance to that of penicillin V.

PROCEDURE B

This procedure is typical of the reaction of isolated 6-aminopenicillanic acid with monocarboxylic acid chlorides.

A solution of phenoxyacetyl chloride (360 mgm.) in dry acetone (5 ml.) was added dropwise during 10 minutes to a stirred solution of 6-aminopenicillanic acid (450 mgm., approximately 75% pure) in 3% aqueous sodium bicarbonate (18 ml.) and acetone (12 ml.). When addition was complete the mixture was stirred at room temperature for 30 minutes and then extracted with ether (30 ml. in 3 portions), only the aqueous phase being retained. This aqueous solution was covered with butanol (5 ml.) and adjusted to pH 2 by the addition of N hydrochloric acid. After separating the layers, the aqueous phase was extracted with two 2.5 ml. portions of butanol, adjusting to pH 2 each time. The combined butanol solutions (which at this stage contained the free penicillin acid) were washed with water (3 x 2 ml.) and then shaken with water (10 ml.) to which sufficient 3% sodium bicarbonate solution was added to bring the aqueous phase to pH 7. The butanol solution was further extracted with two 5 ml. portions of water to each of which was added enough bicarbonate solution to produce an aqueous phase of pH 7. The combined aqueous solutions were washed with ether (20 ml.) and then evaporated at low temperature and pressure to leave the crude sodium salt of phenoxymethyl penicillin which, after drying in a vacuum desiccator, was obtained as a slightly hygroscopic powder (591 mgm.).

The purity of the product was estimated by the penicillinase assay as 73% and, by bio-assay, as 68%. In its chromatographic behavior and its antibacterial spectrum the product showed no significant difference from authentic phenoxymethyl penicillin. It also exhibited the relative stability towards acids which is characteristic of this particular penicillin. No loss of activity could be detected after 2 hours at pH 2.

The following examples will serve to illustrate this invention without limiting it thereto.

Example 1

6-(α-chlorophenylacetamido)penicillanic acid was obtained by the process of Procedure A using α-chlorophenylacetyl chloride in place of phenoxyacetyl chloride and using a fermentation medium based upon peanut meal instead of upon the synthetic material.

The fermentation medium used had the following composition:

| | Parts by weight |
|---|---|
| Water | 100 |
| Lactose | 4.0 |
| Peanut meal | 3.0 |
| $Na_2SO_4$ | 0.1 |
| $CaCO_3$ | 1.0 |

Both the extracted fermentation liquor and the aqueous solution of the reaction product were assayed by the method described in Procedure A with the following results:

| | Activity (International Units) |
|---|---|
| Extracted fermentation liquor (volume 50 ml.) | 700 |
| Reaction product (volume 62 ml.) | 5,332 |

The results show that the activity was more than 7 times as great after reaction with the α-chlorophenylacetyl chloride as before the reaction.

Example 2

The sodium salt of benzhydrylpenicillin, also called 6-(α-phenylphenylacetamido)penicillanic acid, was obtained by the process of Procedure B but using diphenylacetyl chloride instead of phenoxyacetyl chloride. The yield of crude sodium salt (purity 68%) was 111 mgm. per 100 mgm. of 6-aminopenicillanic acid. The percentage remaining after 2 hours at pH 2 was 65%. The product inhibited the growth of *Staph. aureus* at a concentration of 1 in 40,000,000, of *E. coli* at a concentration of 1 in 8,000, of *P. vulgaris* at a concentration of 1 in 4,000, and of *S. typhi* at a concentration of 1 in 8,000.

Example 3

To 1.08 g. (0.005 mole) of 6-aminopenicillanic acid in 10 ml. water at room temperature there was added 1.5 g. (0.0185 mole) of $NaHCO_3$. A small amount of solution was lost by foaming. There was then added 0.93 g. (0.005 mole) of α-methoxyphenylacetyl chloride and the mixture was shaken for 50 minutes in the cold room. The turbid mixture then had a very strong odor of benzaldehyde and was allowed to stand at room temperature for 10 minutes and was then extracted once with ether, which was discarded. The clear, yellow aqueous layer was then added to a solution of 0.99 g. (0.005 mole) of dibenzylamine in 20 ml. dilute acetic acid at pH 5–6. Dibenzylammonium 6-(α-methoxyphenylacetamido)penicillanate monohydrate precipitated immediately as a gum which solidified on trituration. After 45 minutes in an ice bath, this product was collected by suction filtration, washed with water, dried in vacuo over $P_2O_5$ and found to weight 0.47 g., to melt at 105–107.5° C. (d), to contain the β-lactam structure as shown by infrared analysis and to inhibit *Staph. aureus* Smith at a concentration of 0.156 mcg./ml.

*Analysis.*—Calc'd. for $C_{31}H_{35}N_3O_5S \cdot H_2O$: C, 64.3; H, 6.28. Found: C, 64.80, 64.95; H, 6.93, 6.78.

Example 4

Diethyl 2-fluoro-2-phenylmalonate (7 g.) was suspended in 75 ml. of a 25% aqueous sodium hydroxide solution and the resulting suspension was heated on the steam bath until a clear solution was obtained. The clear solution was acidified by addition of concentrated hydrochloric acid to precipitate a solid which was collected by filtration, dried, suspended in 75 ml. 6 N HCl and heated on the steam bath for about one hour until evolution of carbon dioxide subsided. The oily mixture was extracted with chloroform and the chloroform was removed by distillation in vacuo. The residual oil was extracted into dilute aqueous sodium bicarbonate and the resulting aqueous solution was decolorized with charcoal, filtered and acidified with concentrated hydrochloric acid to precipitate α-fluorophenylacetic acid as colorless crystals, 1.7 g., M.P. 84–85° C.

*Analysis.*—Calc'd. for $C_8H_7FO_2$: C, 62.33; H, 4.54. Found: C, 62.65; H, 4.88.

To a cold solution (10° C.) of 1.54 g. (0.010 mole) α-fluorophenylacetic acid in 15 ml. pure, dry dioxane there was added 1.5 ml. triethylamine. The resulting clear solution was stirred and cooled to 5 -10° C. while 1.36 g. (0.010 mole) of isobutyl chloroformate in 5 ml. dioxane was added dropwise. When the addition had been completed, the mixture was stirred at 5–8° C. during ten minutes and then a solution of 2.16 g. (0.01 mole) of 6-aminopenicillanic acid in 15 ml. water and 2 ml. triethylamine was added dropwise while the temperature was maintained below 10° C. The resulting mixture was stirred in the cold during 15 minutes and then at room temperature during 30 minutes. The clear solution was diluted with 30 ml. cold water and extracted with ether, which was discarded. The cold aqueous solution was then acidified to pH 2 with 5 M $H_2SO_4$ after it had been covered with 75 ml. ether. The ethereal extract containing the product, 6-(α-fluorophenylacetamido)penicillanic acid, was dried during 7–10 minutes over anhydrous $Na_2SO_4$ and filtered. The addition of 6 ml. of dry n-butanol containing 0.373 g./ml. potassium 2-ethylhexanoate precipitated the potassium salt of the product which was collected, dried in vacuo over $P_2O_5$ and found to weight 2.20 g., to decompose at 190–192° C., to be soluble in water, to contain the β-lactam structure as shown by infrared analysis, to inhibit *Staph. aureus* Smith at a concentration of 0.07 mcg./ml. and to exhibit upon intramuscular administration to mice versus *Staph. aureus* Smith a $CD_{50}$ of 2.0 mgm./kg.

Example 5

In the procedure of Example 4, the α-fluorophenylacetic acid is replaced by 0.010 mole α-fluoro-p-sulfamylphenylacetic acid,
α-chloro-3,4-dimethoxyphenylacetic acid,
α-bromo-4-methoxyphenylacetic acid,
α-iodo-3-methylphenylacetic acid,
α-phenyl-3-dimethylaminophenylacetic acid,
α-hydroxy-2-methoxyphenylacetic acid,
α-methoxy-3,4,5-trimethoxyphenylacetic acid,
α-acetoxy-2,4-dichlorophenylacetic acid,
α-fluoro-2-nitrophenylacetic acid,
α-chloro-4-methylaminophenylacetic acid,
α-bromo-2-acetamidophenylacetic acid,
α-iodo-2,4-dimethylphenylacetic acid,
α-phenyl-2,4,5-trimethylphenylacetic acid,
α-hydroxy-4-isopropylphenylacetic acid,
α-methoxy-3-bromophenylacetic acid,
α-acetoxy-2-iodophenylacetic acid,
α-fluoro-2-ethylaminophenylacetic acid,
α-chloro-2,5-dihydroxyphenylacetic acid,
α-bromo-3,5-dinitrophenylacetic acid,
α-iodo-3,4-dichlorophenylacetic acid,
α-fluoro-2-methylphenylacetic acid,
α-chloro-4-hydroxyphenylacetic acid,
α-bromo-2-hydroxyphenylacetic acid, and
α-iodo-4-hydroxy-3-methoxyphenylacetic acid,
respectively, to produce the acids 6-(α-fluoro-4-sulfamylphenylacetamido)penicillanic acid,
6-(α-chloro-3,4-dimethoxyphenylacetamido)penicillanic acid,
6-(α-bromo-4-methoxyphenylacetamido)penicillanic acid,
6-(α-iodo-3-methylphenylacetamido)penicillanic acid,
6-(α-phenyl-3-dimethylaminophenylacetamido) penicillanic acid, 6-(α-hydroxy-2-methoxyphenylacetamido)penicillanic acid,
6-(α-methoxy-3,4,5-trimethoxyphenylacetamido)penicillanic acid,
6-(α-acetoxy-2,4-dichlorophenylacetamido)penicillanic acid,
6-(α-fluoro-2-nitrophenylacetamido)penicillanic acid,
6-(α-chloro-4-methylaminophenylacetamido)penicillanic acid,
6-(α-bromo-2-acetamidophenylacetamido)penicillanic acid,
6-(α-iodo-2,4-dimethylphenylacetamido)penicillanic acid,
6-(α-phenyl-2,4,5-trimethylphenylacetamido)penicillanic acid,
6-(α-hydroxy-4-isopropylphenylacetamido)penicillanic acid,
6-(α-methoxy-3-bromophenylacetamido)penicillanic acid,
6-(α-acetoxy-2-iodophenylacetamido)penicillanic acid,
6-(α-fluoro-2-ethylaminophenylacetamido)penicillanic acid,
6-(α-chloro-2,5-dihydroxyphenylacetamido)penicillanic acid,
6-(α-bromo-3,5-dinitrophenylacetamido)penicillanic acid,
6-(α-iodo-3,4-dichlorophenylacetamido)penicillanic acid,
6-(α-fluoro-2-methylphenylacetamido)penicillanic acid,
6-(α-chloro-4-hydroxyphenylacetamido)penicillanic acid,
6-(α-bromo-2-hydroxyphenylacetamido)penicillanic acid, and
6-(α-iodo-4-hydroxy-3-methoxyphenylacetamido)penicillanic acid, respectively, which are isolated as their solid, water-soluble potassium salts and found to inhibit *Staph. aureus* Smith at concentrations below 0.001 percent by weight and to contain the β-lactam structure as shown by infrared analysis.

We claim:
1. A member selected from the group consisting of an acid having the formula

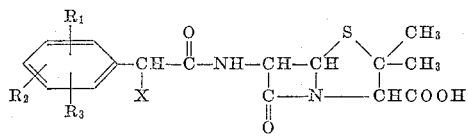

wherein $R_1$, $R_2$ and $R_3$ each represent a member selected from the group consisting of hydrogen, nitro, amino, (lower)alkylamino, di(lower)alkylamino, (lower)alkanoylamino, (lower)alkyl, chloro, bromo, iodo, (lower)alkoxy, hydroxy and sulfamyl, and X represents a member selected from the group consisting of fluoro, chloro, bromo, iodo, phenyl, hydroxy, (lower)alkoxy and (lower)alkanoyloxy; and its sodium, potassium, calcium, aluminum and ammonium salts and its salts with a nontoxic amine selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

2. 6-(α-chlorophenylacetamido)penicillanic acid.
3. 6-(α-phenylphenylacetamido)penicillanic acid.
4. 6-(α-methoxyphenylacetamido)penicillanic acid.
5. 6-(α-fluorophenylacetamido)penicillanic acid.
6. 6-(α-fluoro-2-methylphenylacetamido)penicillanic acid.

References Cited in the file of this patent

UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,934,540 | Sheehan | Apr. 26, 1960 |
| 2,941,995 | Doyle et al. | June 21, 1960 |

FOREIGN PATENTS

| | | |
|---|---|---|
| 569,728 | Belgium | Nov. 15, 1958 |

OTHER REFERENCES

Mortimer et al.: Jour. Amer. Chem. Soc., volume 74, pages 4098–4102 (1952).
Mortimer et al.: Jour. Amer. Chem. Soc., volume 74, pages 4098–99 (1952).
Abstract of Papers, American Chemical Society, 139th meeting (1961), page 36N.